United States Patent [19]
Van Dam et al.

[11] Patent Number: 5,661,825
[45] Date of Patent: Aug. 26, 1997

[54] INTEGRATED OPTICAL CIRCUIT COMPRISING A POLARIZATION CONVERTOR

[75] Inventors: Cornelis Van Dam, Zoetermeer, Netherlands; Helmut Heidrich, Berlin, Germany; Michael Hamacher, Berlin, Germany; Carl Weinert, Berlin, Germany

[73] Assignee: U.S. Philips Corporation, New York, N.Y.

[21] Appl. No.: 532,126

[22] Filed: Sep. 22, 1995

[51] Int. Cl.⁶ .................................................. G02B 6/126
[52] U.S. Cl. .................................................. 385/11; 385/14
[58] Field of Search ................................ 385/10, 11, 14, 385/15, 24, 27–29, 32, 37, 39

[56] References Cited

U.S. PATENT DOCUMENTS

| | | | |
|---|---|---|---|
| 4,793,678 | 12/1988 | Matsumoto et al. | 385/11 |
| 5,185,828 | 2/1993 | Van Der Tol | 385/28 |
| 5,341,444 | 8/1994 | Henry et al. | 385/11 |
| 5,475,771 | 12/1995 | Hosoi | 385/11 |

FOREIGN PATENT DOCUMENTS

| | | |
|---|---|---|
| 0565308 | 10/1993 | European Pat. Off. . |
| 9522070 | 8/1995 | WIPO . |

OTHER PUBLICATIONS

"Polarization–Insensitive Arrayed–Waveguide Grating Wavelength Multiplexer On Silicon" H. Takahashi et al, Optics Letters, Apr. 1, 1992, vol. 17, No. 7, pp. 499–501.

*Primary Examiner*—John D. Lee
*Attorney, Agent, or Firm*—Michael J. Balconi-Lamica; Leroy Eason; Daniel E. Tierney

[57] ABSTRACT

An integrated optical circuit comprises a first device and a second device, which devices are connected by a polarization convertor. The polarization convertor has one or more curved sections of a waveguide, integrated in the optical circuit. The conversion ratio is determined in part by the radius of curvature of the curved sections.

7 Claims, 2 Drawing Sheets

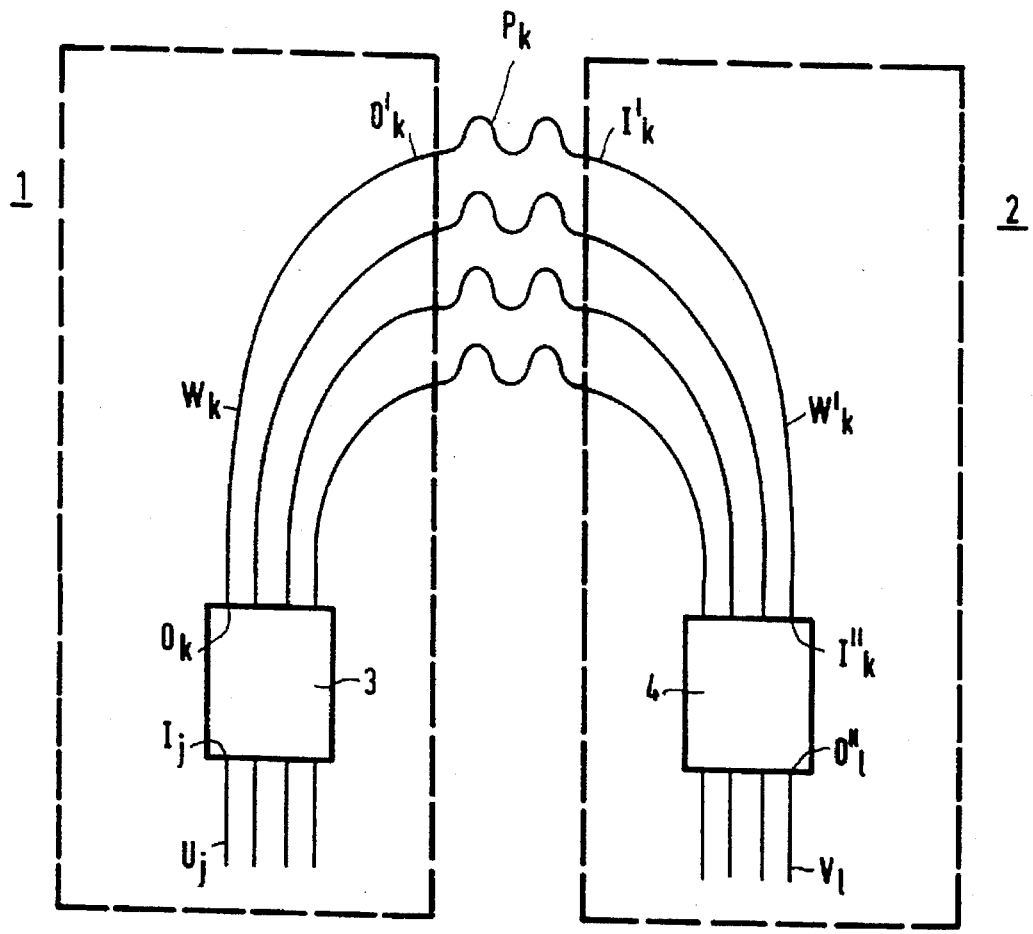
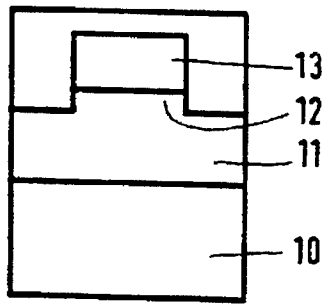
FIG.2A
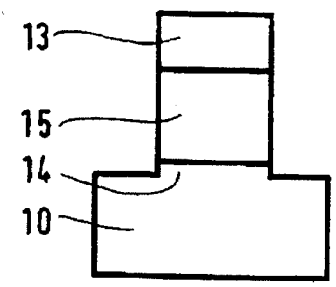
FIG.2B
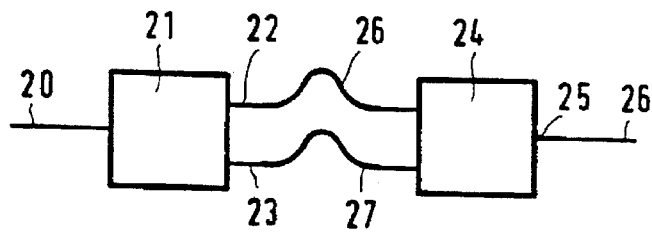
FIG.3

INTEGRATED OPTICAL CIRCUIT COMPRISING A POLARIZATION CONVERTOR

BACKGROUND OF THE INVENTION

1. Field of the Invention

The invention relates to an integrated optical circuit comprising a first device having an output for emitting radiation with a first state of polarization, a second device having an input for receiving radiation with a second, different state of polarization, and a polarization convertor connected between the output and the input.

The polarization convertor converts radiation guided in a TE mode into radiation guided in a TM mode or vice versa. The TE (transverse electric) mode is a mode in which $E_y$ is the dominant electric component and the TM (transverse magnetic) mode is a mode in which $H_y$ is the dominant magnetic component of the electromagnetic field of the radiation. The y-axis is an axis in the plane of the slab-type substrate of the circuit and perpendicular to the direction of propagation of the radiation. The conversion ratio is the ratio of the amount of radiation in one mode which the convertor converts to radiation in the other mode.

2. Discussion of the Related Art

A circuit as described in the opening paragraph is known from U.S. Pat. No. 5,185,828, disclosing an optical input section for a coherent optical receiver operating on the basis of polarization diversity. The first device is a local radiation source, emitting TE polarized radiation. The polarization convertor changes the state of polarization to 50% TE and 50% TM polarized radiation. The second device comprises a mixer for combining the converted local oscillator radiation with signal radiation, and a detection circuit. The polarization convertor comprises a straight waveguide having a geometric structure consisting of a period sequence of waveguide sections with different widths. Drawbacks of the polarization convertor are that its length is relatively large, of the order of millimeters, and that it has a small bandwidth due to its length.

SUMMARY OF THE INVENTION

It is an object of the invention to provide an integrated optical circuit comprising a relatively small polarization convertor having a large bandwidth.

The object is met by a circuit as described in the opening paragraph, which circuit is characterized according to the invention in that the polarization convertor comprises a curved section of a waveguide. The polarization conversion ratio of the cured section depends on the materials and the geometry of the waveguide. Since a curved waveguide can be made relatively short, the convertor can be made small, resulting in a large bandwidth. The curved section may form an angle of 90° for easy connection to devices of the circuit. The angle may also be smaller or larger than 90°.

The conversion ratio increases with decreasing radius of curvature of the curved section. Since a radius of curvature of 100 μm already causes an appreciable conversion ratio, the radius of curvature is preferably smaller than 100 μm.

A strongly curved section of a waveguide may show radiative losses of the guided radiation. The losses may be reduced substantially when according to the invention the curved section of the waveguide has a deep etched waveguide structure.

The conversion originates at locations in the waveguide where the radius of curvature changes. Hence, in cases where the conversion ratio of a single curved section is not sufficient, several curved sections may be concatenated, each transition between sections increasing the conversion ratio of the convertor. The curved sections may be connected by straight waveguide sections. Two curved sections may be connected to form an S shape or a U shape. The sections are preferably arranged to form a meander line, thereby reducing the space in the circuit occupied by the polarization convertor and making it possible to have the input and output of the convertor in line.

In a special embodiment of the circuit according to the invention the polarization convertor functions as a lambda-over-two plate. Such a convertor is especially suitable for use in circuits where the guiding of radiation through a waveguide is polarization dependent. The convertor should preferably be arranged at a symmetric location in the waveguide, such that the polarization dependencies of the waveguide on both sides of the convertor are equal.

A circuit in which the polarization convertor can be used advantageously is a phased-array wavelength multiplexer or demultiplexer. When a polarization convertor functioning as a lambda-over-two plate is arranged in the middle of each waveguide of the phased array, the performance of the phased array will be polarization independent.

It is remarked that a polarization-independent phased-array multiplexer is known from an article by Takahashi et al, published in Optics Letters, 1992, volume 17, no. 7 page 499 to 501. The phased array is made polarization independent by inserting a lambda-over-two quartz plate half-way the waveguides of the array. However, such a multiplexer cannot be integrated on a single substrate. It requires two substrates with the quartz plate in between, thereby generating additional radiation losses in the transitions between the substrates and the quartz plate.

Another advantageous embodiment of the circuit according to the invention is a Mach-Zehnder interferometer switch wherein the switching is realized by electro-optic phase shifters. Since the electro-optic effect is different for TE and TM polarized radiation, the operation of a known interferometer switch will be polarization dependent. According to the invention each of the shifters in the arms of the interferometer comprises a polarization convertor in the form of a curved section of a waveguide. The polarization conversion of the curved waveguide compensates the polarisation dependence of the shifters, making the switch polarization independent.

BRIEF DESCRIPTION OF THE DRAWINGS

The invention will now be described by way of example and with reference to the accompanying drawings, in which FIG. 1 shows a phased-array (de)multiplexer, FIG. 2A shows a cross-section of a waveguide of the phased array of FIG. 1, FIG. 2B shows a cross-section of a waveguide of the polarization convertor of FIG. 1, FIG. 3 shows a Mach-Zehnder interferometer switch.

DETAILED DESCRIPTION OF THE PREFERRED EMBODIMENTS

Figure 4:
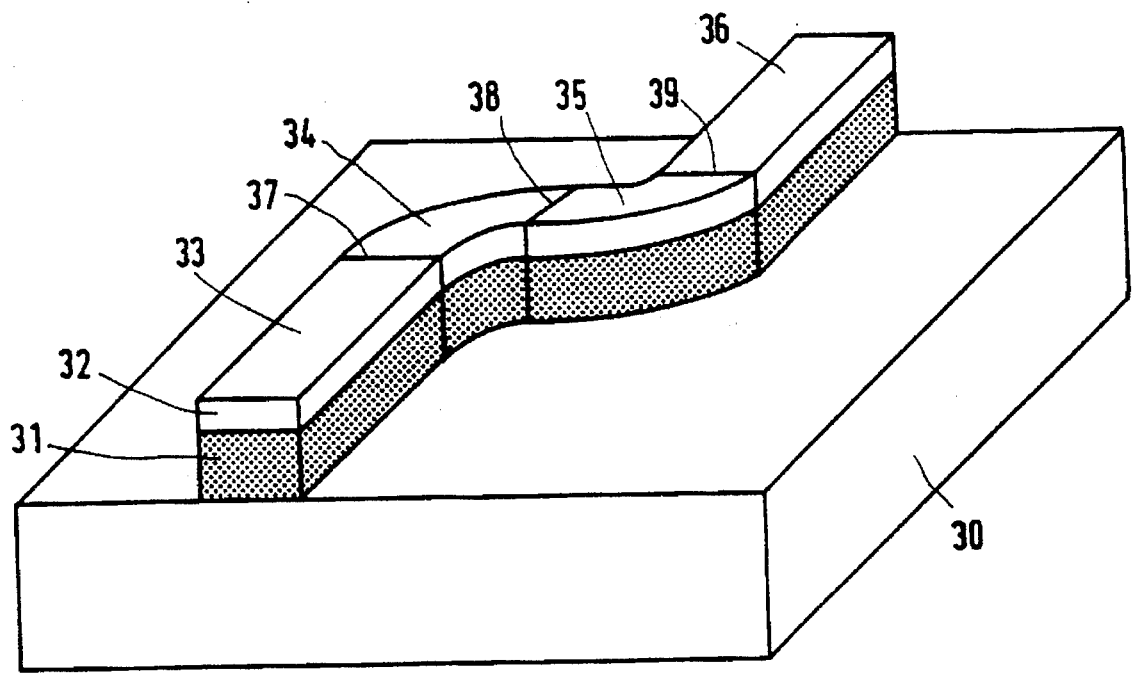
FIG. 4 shows a waveguide having two curved sections.

FIG. 1 shows an integrated polarization-insensitive phased-array multiplexer according to the invention. Such a circuit is particularly useful in the field of optical communications to combine optical beams at pump and signal wavelengths in an optical amplifying system. Multiplexers can also be used to increase the transmission capacity of optical fibres by adding closely spaced wavelength bands. Different wavelength bands can be used to provide bidirectional transmission on a single fibre. A demultiplexer can be used to perform the operation opposite to that of a multiplexer, i.e. decomposing an incoming signal into its constituting wavelength bands.

The circuit shown in FIG. 1 comprises two devices 1 and 2 integrated on a single slab-type substrate. The first device 1 has an optical coupler 3, operating as a splitter, for connecting four inputs $I_j$ (j=1, 2, 3, 4) to four outputs $O_k$ (k=1, 2, 3, 4). An input waveguide $U_j$ is connected to each input $I_j$. Each output $O_k$ is connected to one end of a waveguide $W_k$. Device 1 has outputs $O'_k$, each of which is connected to the other end of waveguide $W_k$ (k=1, 2, 3, 4). The second device 2 has an optical coupler 4, operating as a combiner, for connecting four inputs $I''_k$ (k=1, 2, 3, 4) to four outputs $O''_m$ (m=1, 2, 3, 4). Device 2 has four inputs $I'_k$, each of which is connected to one end of a waveguide $W'_k$. The other end of waveguide $W'_k$ is connected to the related input $I''_k$. Each output $O''_m$ is connected to a waveguide $V_m$. The couplers may be radiative couplers as known from inter alia European patent application nr. 0 565 308 or multi-mode interference (MMI) couplers as known from international patent application WO 95/22070 (PHN 15 175). The plurality of waveguides $W_k$ and $W'_k$ form together the phased-array of the multiplexer. The size of the circuit is of the order of a few square millimeters.

Each output $O'_k$ of device 1 is connected to the corresponding input $I'_k$ of device 2 by means of a polarization convertor $P_k$ (k=1, 2, 3, 4). Each polarization convertor comprises a waveguide in the form of a meander line with a double U-bend, each bend having a radius of curvature of 50 μm and the convertor having an overall length of about 500 μm. The small size of the convertor can be used advantageously in miniaturizing optical circuits. The size of the polarization convertors is so small, that they can easily be integrated in the phased array. The radius of curvature is chosen such that the polarization convertor operates as a lambda-over-two plate, changing an incoming TE polarization to an outgoing TM polarization and an incoming TM polarization to an outgoing TE polarization. Thus TE polarized radiation at $O_k$ will travel through waveguide $W_k$ of the phased array as TE wave and through waveguide $W'_k$ of the phased array as TM wave, whereas TM polarized radiation at $O_k$ will travel through waveguide $W_k$ as TM wave and through waveguide $W'_k$ as TE wave. When the waveguides are birefringent, the velocities of propagation of TE and TM polarized radiation will be different. In the phased array according to the invention, incoming radiation always travels half of its path with the velocity of a TE wave and half with the velocity of TM wave. As a result the total travel time of radiation through the two waveguides $W_k$ and $W'_k$ is independent of the state of polarization of the radiation at output $O_k$.

Although FIG. 1 shoes a circuit with four input waveguides $U_j$ and four output waveguides $V_m$, it is also possible to have a single input waveguide and a plurality of output waveguides, the circuit forming a wavelength demultiplexer. A circuit with a plurality of input waveguides and one output waveguide can be used as a multiplexer, whereas a circuit with one input waveguide and one output waveguide can be used as a comb filter.

FIG. 2A shows a cross-section of a waveguide $W_k$ of the circuit shown in FIG. 1. On a substrate 10 of InP a quaternary InGaAsP guiding layer 11 is grown with a thickness of 0.5 μm outside a rib 12 and a thickness of 0.6 μm inside the rib. A layer 13 of 0.3 μm thick and 1.4 μm wide InP is grown on top of rib 12. FIG. 2B shows a cross-section of a curved section of the waveguide in one of the polarization convertors $P_k$. The cross-section is similar to the cross-section shown in FIG. 2A, with the difference that a single additional manufacturing step has been applied to the circuit in the form of locally deep etching. As a result, the substrate 10 has the profile of a rib 14 and the quaternary layer 15 has the width or the rib over its entire height. The two waveguides shown in FIGS. 2A and 2B can be easily made on a single substrate, the waveguide of FIG. 2B requiring only a single additional etching step.

FIG. 3 shows a Mach-Zehnder interferometer switch according to the invention. An input waveguide 20 is connected to a first coupler 21, operating as a splitter, having two waveguides 22 and 23 connected to its outputs. The waveguides are connected to a second coupler 24, operating as a combiner, having an output 25 with a waveguide 26 connected to it. Waveguides 22 and 23 form the arms of the interferometer. Part of the waveguides 22 and 23 is overlaid with electrodes 26 and 27 respectively, indicated in the drawing by two thick lines. The electrodes make it possible to change the propagation velocity of the modes in each waveguide electrically. Different electro-optical physical effects can be used to change the refractive indices of the waveguide material, for example carrier injection, carrier depletion or electro-refraction. The electrodes and the part of the waveguides beneath them operate as phase shifters, adapting the phases of the radiation guided in the interferometer arms to the phases required at the entrance of second coupler 24 in order to obtain constructive or destructive interference at output 25.

The sections of waveguides 22 and 23 beneath the electrodes 26 and 27 respectively are curved according to the invention. Since the electro-optical effects are different for TE and TM polarizations, a switch without the curved waveguide sections would be polarization dependent. In the switch according to the invention the curved sections operate as polarization convertors, making the operation of the switch polarization independent.

FIG. 4 shows a curved section of a waveguide for use as a polarization convertor. An InP substrate 30 is provided with a waveguide comprising a quaternary layer 31 having a thickness of 590 nm and a top layer 32 of InP with a thickness of 295 nm; the width of quaternary layer 31 and top layer 32 is 1.4 μm each. The waveguide is designed for radiation with a wavelength of 1.508 μm. The waveguide has in succession a straight section 33, two curved sections 34 and 35, each forming an angle of 90°, and another straight section 36. The polarization transformations occur at the transitions 37, 38 and 39 between the sections 33, 34, 35 and 36. The transformation is strongest at transition 38 between the two oppositely curved sections.

Figure 5:
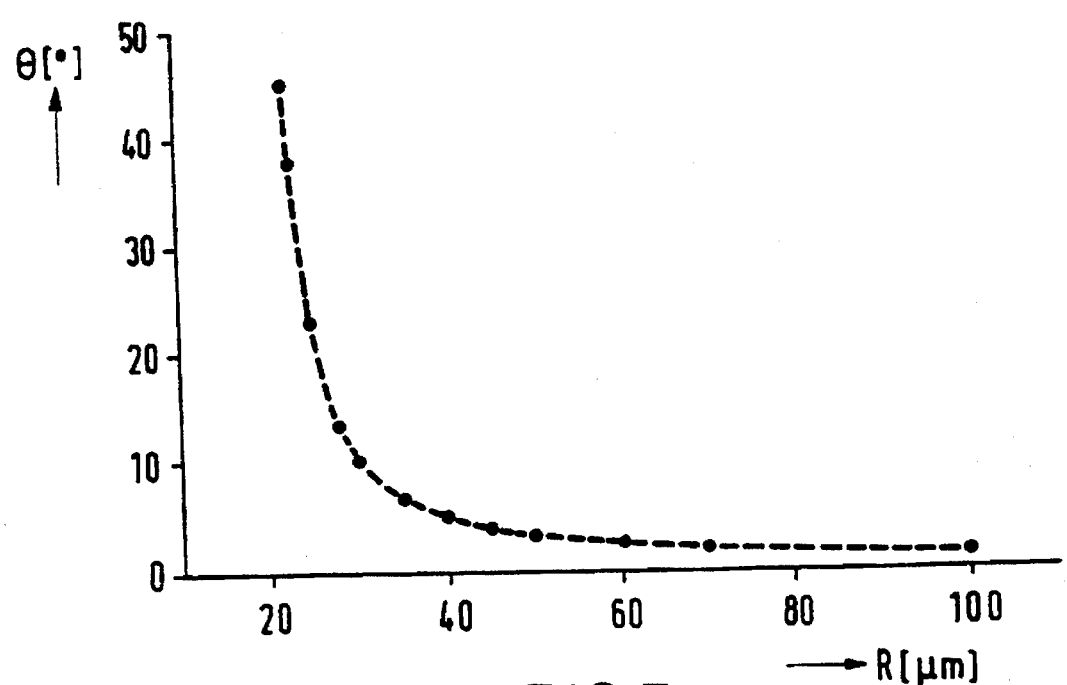
FIG. 5 shows the polarization conversion ratio for a single discontinuity of the waveguide of FIG. 4.

FIG. 5 shows the calculated conversion θ at transition 37 as a function of the radius of curvature R of section 34. The conversion is expressed as an angle between the polarization before and after the transition. Hence, a conversion ratio of one, i.e. a complete conversion from TE to TM polarization, corresponds to θ=90°. The efficiency of the conversion is apparent from the Figure. A conversion of θ=10° is already achieved in a transition from a straight waveguide section to a section with R=30 μm, and θ=45° for R is about 22 μm. The beatlength between orthogonal modes of the radiation is of the order of 5 mm for a conversion of θ=45°, making the conversion approximately independent of the length of the curved sections. The above calculations have been confirmed by measurements on curved waveguides.

The embodiments of the invention shown in the Figures have curved waveguide sections which are connected to another curved section or to a straight section such that the centreline of the sections is a continuous line. However, the centreline may also show a stepwise, lateral displacement at the transition of two sections in order to match radiation profiles of the sections, thereby reducing radiative losses at the transition.

We claim:

1. An integrated optical circuit comprising:

a first device having an output for emitting radiation with a first state of polarization;

a second device having an input for receiving radiation with a second state of polarization different from the first state of polarization;

a waveguide connecting the output and input of the first and second devices, respectively; and a polarization converter comprising one or more sections of the waveguide wherein there is a change in the radius of curvature.

2. The integrated optical circuit as claimed in claim 1, wherein a minimum radius of curvature of the curved section is less than 100 μm.

3. The integrated optical circuit as claimed in claim 1, wherein the curved section is a deep etched waveguide structure.

4. The integrated optical circuit as claimed in claim 1, wherein said polarization convertor comprises several curved sections forming a meander line.

5. The integrated optical circuit as claimed in claim 1, wherein said polarization convertors functions as a lambda over two ($\lambda/2$) plate.

6. The integrated optical circuit as claimed in claim 1, wherein said first and second device together form an integrated phased-array multiplexer, said first device comprising a splitter having a plurality of outputs and first waveguides connected to the outputs, said second device comprising a plurality of second waveguides and a combiner having a plurality of inputs, the second waveguides being connected to the inputs, and further wherein said polarization convertor connects one of the first waveguides width one of the second waveguides.

7. The integrated optical circuit as claimed in claim 1, wherein said first and second device together form an integrated Mach-Zehnder interferometer switch, said first device comprising a splitter having a plurality of outputs and first waveguides connected to the outputs, said second device comprising a plurality of second waveguides and a combiner having a plurality of inputs, the second waveguides being connected to the inputs, and further wherein said polarization convertor is combined with an electro-optic switch connecting one of the first waveguides with one of the second waveguides.

* * * * *